Oct. 10, 1950     F. W. SHERWOOD     2,525,001
ORNAMENTAL LAMP FOR VEHICLES
Filed March 12, 1948
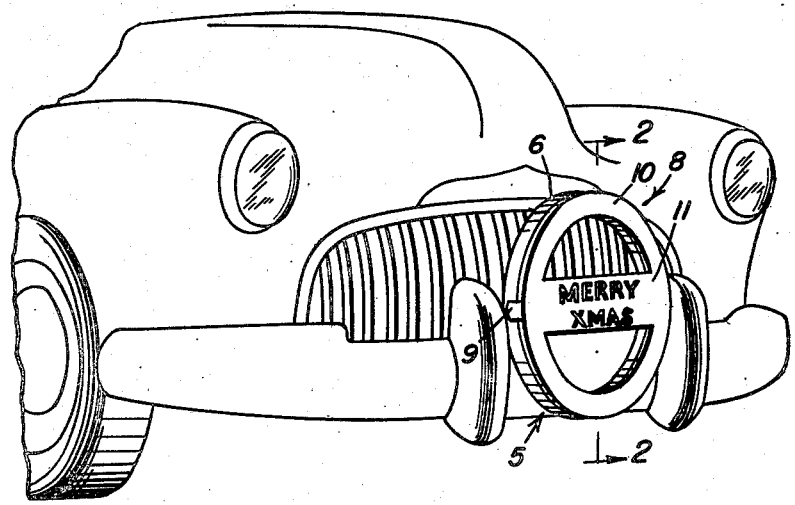
Fig. 1.
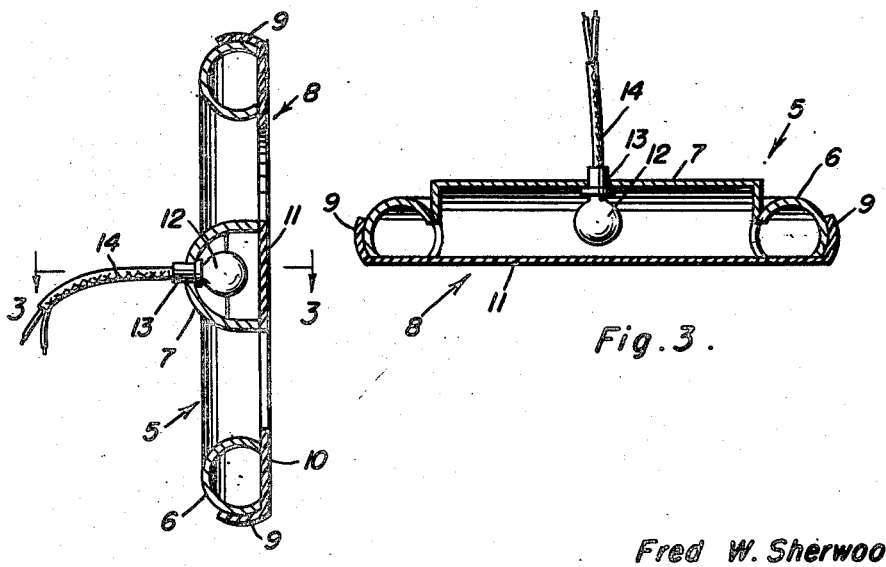
Fig. 2.
Fig. 3.
Fred W. Sherwood
INVENTOR.
BY Patented Oct. 10, 1950

2,525,001

UNITED STATES PATENT OFFICE 2,525,001

ORNAMENTAL LAMP FOR VEHICLES

Fred W. Sherwood, Edinburg, Maine

Application March 12, 1948, Serial No. 14,573

1 Claim. (Cl. 40—130)

The present invention relates to a novel ornamental device which is especially, but not necessarily, adapted to be mounted and displayed for use on vehicles such as automobiles, trucks, busses, street cars and the like, the same being illuminable, whereby to provide a simple and attractive lamp.

More specifically, the invention has to do with an illuminable vehicle lamp which is adapted to display seasonal messages such as Merry Christmas, Happy New Year, etc.

Another object of the invention is to provide an ornamental message displaying lamp which is novel in appearance in that it is made to represent either a Christmas wreath on the one hand or a spare tire on the other hand.

A further object of the invention is to provide a simple and economical ornamental and illuminable lamp for display use on vehicles, the same being such in construction that a single small lamp bulb, centrally arranged, serves as a simple source of light for the overall device.

Other objects and advantages will become more readily apparent from the following description and the accompanying illustrative drawings.

In the drawings, wherein like numerals are employed to designate like parts throughout the views:

Figure 1 is a perspective view of the forward end portion of an automobile showing my invention and the manner in which it is, under ordinary circumstances, used;

Figure 2 is a slightly enlarged central vertical sectional view taken on the plane of the line 2—2 of Figure 1, looking in the direction of the arrows;

Figure 3 is a horizontal section on the line 3—3 of Figure 2, looking in the direction of the arrows.

Referring now to the drawings by distinguishing reference numerals and lead lines it will be seen that the lamp comprises an annular frame 5 of metal or other suitable material, said frame being hollow and part-cylindrical in cross section as denoted at 6. The frame also includes a horizontal centrally situated cross brace or spider 7 which is also channel-shaped in cross section. The open sides of the portions 5 and 7 face outwardly or toward the observer and said faces are closed by a cover-type lens 8 which is preferably made of unbreakable plastic material, the same being appropriately held in place by marginal attaching fingers 9. The lens includes a flat annulus 10 which cooperates with and closes the open side of the annular main frame 5 and a central cross piece 11 which closes the open side of the brace or spider 7. The plastic is preferably frosted and appropriately colored to suit the occasion. Moreover, appropriate messages such as Merry Xmas, Happy New Year, and the like are printed or otherwise displayed for view in the manner indicated in Figure 1 of the drawings.

In connection with the foregoing aspect of the invention I would point out that the inscriptions or messages to be employed on the lens will be seasonal and in keeping with various occasions where automobiles are used for parading, special festivities, political gatherings and what-not. Also, it is within the purview of the invention to make the closure lens 8 readily applicable and removable so that a user may attach a lens, having a predetermined message thereon, depending on the special occasion for which it is needed.

A further phase of the invention has to do with the employment of a simple and economical electric lamp bulb 12, this being mounted in a socket 13 provided therefor on the central rear portion of the spider, current being supplied to said socket by way of a conductor cord 14. Inasmuch as the ends of the spider open into diametrically opposite side portions of the annular main frame it will be seen that the single simple and economical source of light will serve to provide adequate illumination for the entire device.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

An ornamental lamp for decorative use on vehicles comprising an annular frame, said frame being part-cylindrical in cross section and open on one side, a cross-spider situated within the confines of said annular frame, said spider being in a plane with said annular frame, channel-shaped in cross section and having open ends connected with diametrically opposite inner peripheral wall portions of said frame and thus in open communication with said frame, a single accessible lamp bulb mounted centrally in said cross-spider to supply light to same and also to the interior of said frame, and a legend carrying transparent frosted lens removably mounted on said frame and including an annular portion closing the open side of the annular frame, and a flat cross portion attached at its ends to said annular portion and closing the open side of said cross-spider.

FRED W. SHERWOOD.

REFERENCES CITED

The following references are of record in the file of this patent:

UNITED STATES PATENTS

| Number | Name | Date |
| --- | --- | --- |
| 1,305,696 | Dawes | June 3, 1919 |
| 1,636,141 | Mammen | July 19, 1927 |
| 1,798,199 | Gans | Mar. 31, 1931 |
| 1,851,335 | Taliaferro | Mar. 29, 1932 |
| 1,864,706 | Albright | June 28, 1932 |
| 2,041,189 | Keating et al. | Feb. 1, 1938 |
| 2,106,891 | Hammer | Feb. 1, 1938 |
| 2,163,614 | Mansell | June 27, 1939 |